United States Patent [19]
Yaron et al.

[11] Patent Number: 5,945,907
[45] Date of Patent: Aug. 31, 1999

[54] APPARATUS AND METHODS FOR PARKING A VEHICLE USING POSITION DETECTION SENSOR

[75] Inventors: Michael Yaron, 936 Moredon Rd., Meadowbrook, Pa. 19046; Bernard Katz, Rockaway, N.J.; Karl E. Geisel, Montebello, N.Y.

[73] Assignee: Michael Yaron, Meadowbrook, Pa.

[21] Appl. No.: 08/958,082

[22] Filed: Oct. 27, 1997

[51] Int. Cl.⁶ ........................................... B60Q 1/00
[52] U.S. Cl. ..................... 340/436; 340/435; 340/932.2
[58] Field of Search .................... 340/435, 436, 340/438, 932.2

[56] References Cited

U.S. PATENT DOCUMENTS

| | | | |
|---|---|---|---|
| 3,493,925 | 2/1970 | Brancale | 340/932.2 |
| 4,013,851 | 3/1977 | Abbondante . | |
| 4,146,107 | 3/1979 | Ebbeson et al. . | |
| 4,346,293 | 8/1982 | Fetzer . | |
| 4,361,202 | 11/1982 | Minovitch . | |
| 4,808,997 | 2/1989 | Barkley et al. | 340/942 |
| 4,855,736 | 8/1989 | Hsu | 340/901 |
| 5,004,997 | 4/1991 | Shisgal et al. | 340/436 |
| 5,012,222 | 4/1991 | Garvrilis | 340/436 |
| 5,028,920 | 7/1991 | Dombrowski | 340/904 |
| 5,177,479 | 1/1993 | Cotton | 340/932.2 |
| 5,208,586 | 5/1993 | Friberg et al. | 340/932.2 |
| 5,212,467 | 5/1993 | Park | 340/435 |
| 5,231,392 | 7/1993 | Gust | 340/932.2 |
| 5,285,205 | 2/1994 | White | 340/932.2 |
| 5,293,152 | 3/1994 | Bussin et al. | 340/435 |
| 5,386,285 | 1/1995 | Asayama | 340/435 |
| 5,432,508 | 7/1995 | Jackson | 340/932.2 |
| 5,483,501 | 1/1996 | Park et al. | 367/140 |
| 5,504,314 | 4/1996 | Farmont | 340/932.2 |
| 5,531,118 | 7/1996 | Knoll et al. | 73/628 |
| 5,574,426 | 11/1996 | Shisgal et al. | 340/435 |
| 5,581,232 | 12/1996 | Tanaka et al. | 340/435 |
| 5,602,542 | 2/1997 | Widmann | 340/903 |
| 5,623,259 | 4/1997 | Giangardella | 340/932.2 |
| 5,646,614 | 7/1997 | Abersfelder et al. | 340/932.2 |
| 5,650,765 | 7/1997 | Park | 340/436 |
| 5,684,473 | 11/1997 | Hibino et al. | 340/903 |
| 5,689,250 | 11/1997 | Kremser | 340/904 |

OTHER PUBLICATIONS

Polaroid "Ultrasonic Ranging System Handbook Application Notes/Technical Papers", pp. 1–25.

*Primary Examiner*—Jeffery A. Hofsass
*Assistant Examiner*—Toan Pham
*Attorney, Agent, or Firm*—Nixon & Vanderhye P.C.

[57] ABSTRACT

A sensing and indicating device is mounted at a fixed location to determine the distance between the sensor and an approaching vehicle. The sensor provides visual and/or audible indication of the distance between the vehicle and the sensor. The driver of the vehicle uses that displayed or audible information to locate the vehicle within a defined space or envelope, e.g., within a garage. The sensor and indicator may also be located laterally with respect to the vehicle so that the distance between the vehicle side and the sensor can be determined whereby the vehicle can be located laterally within the defined space or envelope.

12 Claims, 10 Drawing Sheets

FIG. 5A
START-UP

FIG. 5B
AWAY

FIG. 5C(i) PARK

FIG. 5C(ii)
PARK (Cont.)

FIG. 5D
HOME

APPARATUS AND METHODS FOR PARKING A VEHICLE USING POSITION DETECTION SENSOR

BACKGROUND AND SUMMARY OF THE INVENTION

The present invention relates to a vehicle distance sensor and indicator. It particularly relates to an apparatus and methods for determining the location of a vehicle in a defined spaced and affording an indication to the driver of the vehicle of the location of the vehicle relative to a reference location.

As most vehicle drivers can attest, parking a vehicle in a defined space, e.g., a garage, oftentimes can be quite difficult. Most drivers have difficulty in accurately judging the distance, for example, between the front bumper of the vehicle and a rear wall of a garage. Frequently, the driver may not advance the vehicle sufficiently such that the rear of the vehicle clears the garage door. Conversely, the driver may misjudge the distance between the front bumper and the rear wall of the garage and impact the vehicle against the rear wall. With recent design changes in automotive bumpers, a forceful impact of this type can oftentimes lead to substantial damage to the bumper necessitating its repair or replacement, not to mention the damage to the rear wall of the garage.

Further, it is also desirable to locate the vehicle within the defined space a certain distance from one or more reference locations laterally of the vehicle. For example, it is desirable to locate the vehicle when parking in a garage a minimum distance from the side wall of the garage to enable the door of the vehicle to be fully opened for ingress and egress. Those distances are often inaccurately judged by the driver, resulting in damage to the side door of the vehicle when the door is opened and impacted against a side wall or other objects to the side of the vehicle.

In accordance with the present invention, there is provided a novel and improved sensing and signaling device to enable the driver of a vehicle to locate the vehicle within a defined space or envelope and indicate to the driver that the vehicle is located within such space or envelope. To accomplish this, the present invention provides a sensor, for example, an ultrasonic sensor mounted adjacent to or within the defined space, e.g., on the rear wall of a garage, for purposes of sensing the distance the vehicle is from the sensor and providing an indication to the driver of the distance from a desired reference location, typically the sensor. While the sensor may be of a number of different types, e.g., infrared, radar, microwave, preferably an ultrasonic sensor is provided. The ultrasonic sensor when mounted, e.g., on the rear wall of the garage, transmits an ultrasonic signal toward the oncoming vehicle. The echo of the signal reflected by the vehicle is returned to a receiver section of the sensor. The returned echo, processed through appropriate circuitry, i.e., given the known speed of the signal and the time between transmittal and receipt of the echo, is used to determine the distance of the vehicle from the sensor.

An output signal as a function of that distance signal can be used to provide visual and audible indications to the driver of the vehicle regarding the progress of the vehicle toward the sensor. For example, a series of lights may be provided on the sensor indicating predetermined distances of the vehicle from the sensor or a reference location. Thus, when the vehicle enters the preferred position within the defined space, a light, for example, a red light, may be actuated by the receiving section of the sensor to indicate to the driver that the vehicle is properly located, e.g., vis-a-vis its distance from the rear wall of the garage. Similar sensing units can be provided along one or both of the opposite sides of the vehicle. In this manner, the driver of the vehicle can position the vehicle both in the direction of motion of the vehicle and in directions perpendicular to its direction of motion within the defined space or envelope.

In a preferred embodiment according to the present invention, there is provided a method of positioning a vehicle within a defined space comprising the steps of providing a sensor fixed at a predetermined location, sensing the proximity of the vehicle relative to the sensor as the vehicle enters the defined space and using the sensed proximity, indicating to a driver of the vehicle the proximity of the vehicle to a reference location thereby enabling the driver of the vehicle to position the vehicle within the defined space.

Accordingly, it is a primary object of the present invention to provide a novel and improved vehicle position sensor and indicating device enabling a driver of a vehicle to accurately and consistently locate the vehicle within a defined space or envelope.

BRIEF DESCRIPTION OF THE DRAWINGS

FIGS. 5A to 5D are flow charts of exemplary program instructions executed by a processor associated with the present invention for initializing the sensing and indicating system during a set-up procedure (FIG. 5A), sensing for vehicle detection while the vehicle is away from its parking position (FIG. 5B), sensing the vehicle while the vehicle is parking (FIG. 5C(i) and (ii)), and sensing the vehicle when it is parked (FIG. 5D).

DETAILED DESCRIPTION OF THE DRAWINGS

Figure 2:
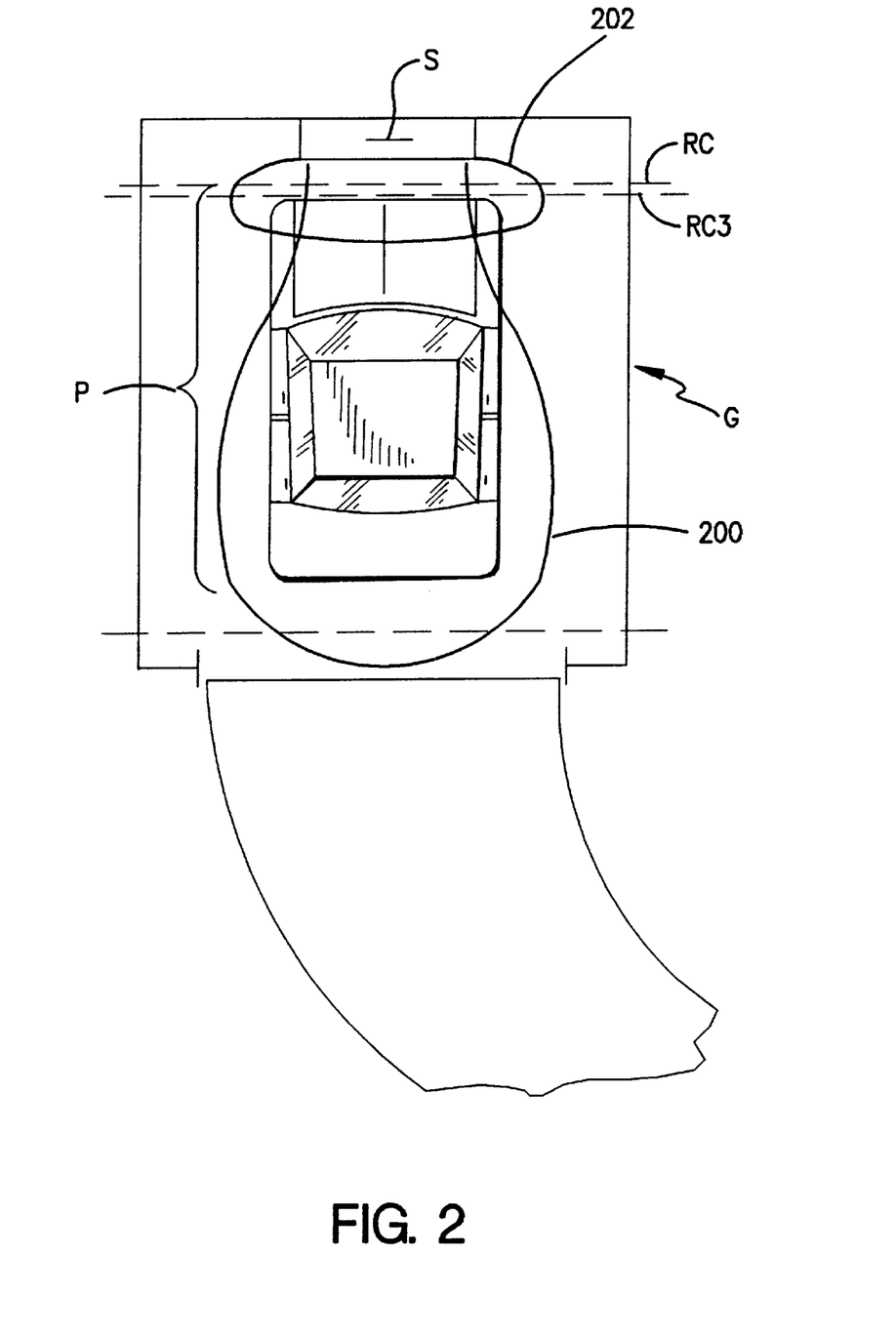
FIG. 2 is a schematic representation of a vehicle within a garage mounting the sensors on the rear wall of the garage G for determining and indicating the position of the vehicle V within a parking position P the garage in accordance with the present invention.

Referring now to FIG. 2, there is illustrated a vehicle V located within a defined space or envelope, for example, within the confines of a garage generally designated G, and having a combined sensor and indicator generally designated S mounted along the rear wall of the garage. Similar sensors can be located along one or both of the side walls of the garage, the front wall or any other location from which the sensor can be used to determined the location of the vehicle. The fields of sensing are indicated by the areas 200, 202 in FIG. 2. Field area 202 represents a parked position, in that when the vehicle enters area 202, it is determined to be properly in the parked P position. Field area 200 represents a parking zone, and when the vehicle enters this zone, the sensor activates its parking mode. As the vehicle is driven into the garage and toward the sensor, the sensor according to the present invention determines the distance the vehicle is from the sensor and provides an indication of that distance such that the driver of the vehicle may locate the vehicle in a predetermined position within the garage.

The sensor repeatedly measures the distance to the vehicle. The sensor makes both short- and long-range measurements, depending on whether the vehicle is moving towards the parking position, or is at the parking position. The measurement routine for the sensor first determines what the last measured value was. The first distance measurement is made using a short-range measurement mode.

A series of subsequent distance measurements are made. If the echo attenuation exceeds the transmit-receive system overall gain in the short range mode, a long-range mode measurement is made 100 milliseconds after the first measurement (this eliminates false secondary echo rebounds). A short-range measurement is first done to eliminate false readings resulting from secondary echo rebounds when a long measurement is made on a close object. If the last-measured distance was greater than a maximum limit (e.g., 16 feet), then the sensor switches to a long-range measurement (300 microsecond) mode. If the last measured distance was less than the maximum limit, the sensor goes to its short-range measurement mode (61 microseconds). If the echo is within the short range, the vehicle is properly in the parking position and a signal, e.g., red light, is given that the vehicle is at the parking position.

Figure 1:
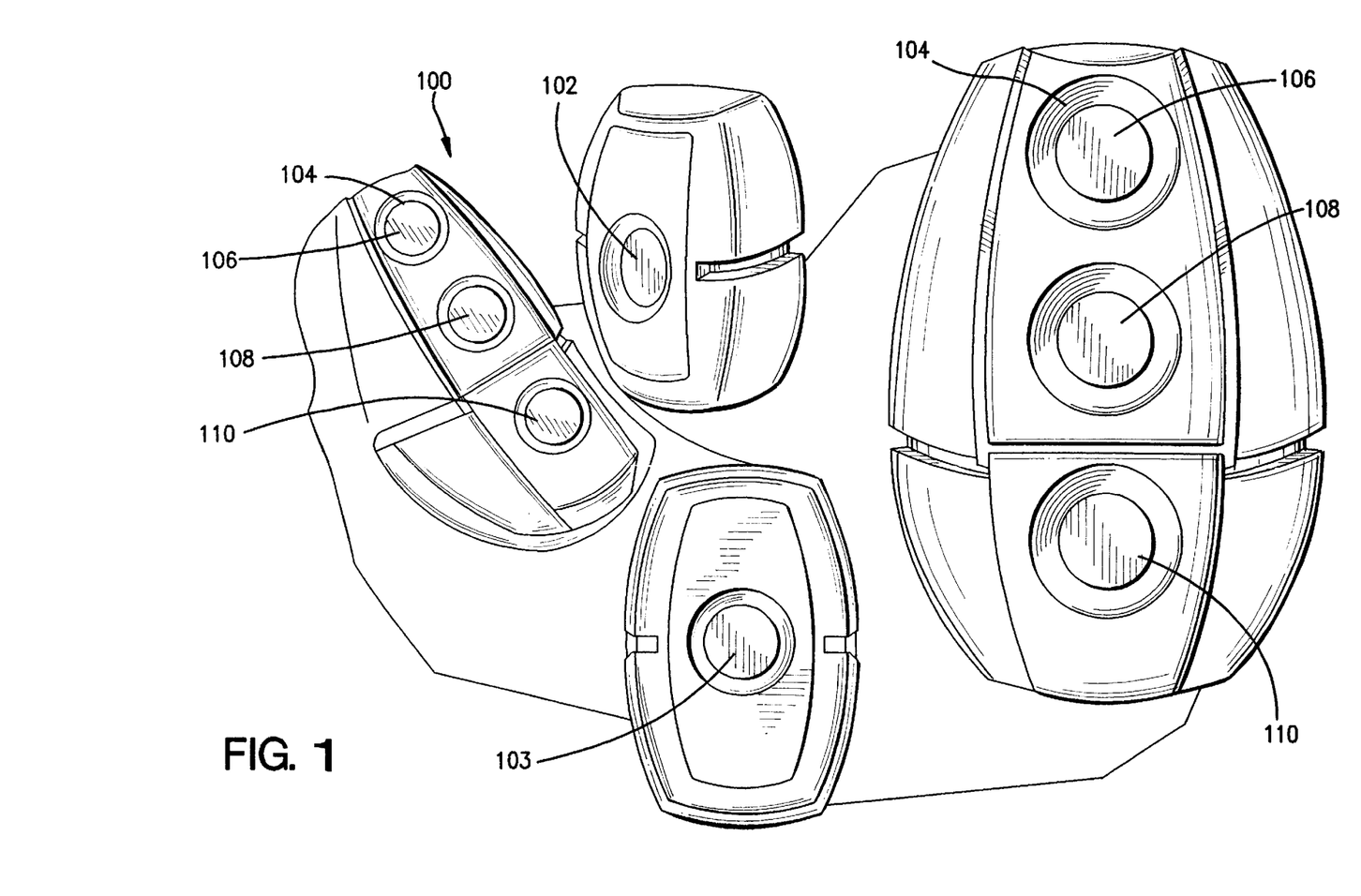
FIG. 1 is a perspective view of a combined set of sensors and indicators according to the present invention.

As indicated in FIG. 1, sensor 100 may be provided as an integrated unit with the transmission and receiving sections of the sensor, both of which sections may be implemented in a single sensor transducer 102 (or multiple transducers 103) and circuit, as well as the indicators 104 for the driver of the vehicle in a single compact unit mounted on the rear wall of the garage. As illustrated in FIG. 1, the sensor 100 may have green 106, yellow 108 and red 110 light indicators 104, audio indicators or a combination of light and audio indicators. For example, light indicators 104 may comprise a series of colored lights, e.g., red, green, yellow, each of which is indicative of a predetermined distance or range of distances from the vehicle to the sensor. The audio system may provide verbal warnings of the distance via an audio speaker (not shown), with an adjustable volume control.

By way of example, a green light 106 may be used to signal a driver to continue approaching with the vehicle to the desired parking location, a yellow light 108 may be used to signal that the approach should be slowed as the vehicle is nearing the desired parking location, e.g., 2 to 4 feet or one meter, and a red light 110 may be used to signal that the vehicle should be stopped as it is at its desired parking location. It will be appreciated that digital read-outs of the distance or an audio sound signal may also be provided to signal the driver as to the relative position of the vehicle with respect to its desired parking location.

Figure 3A:
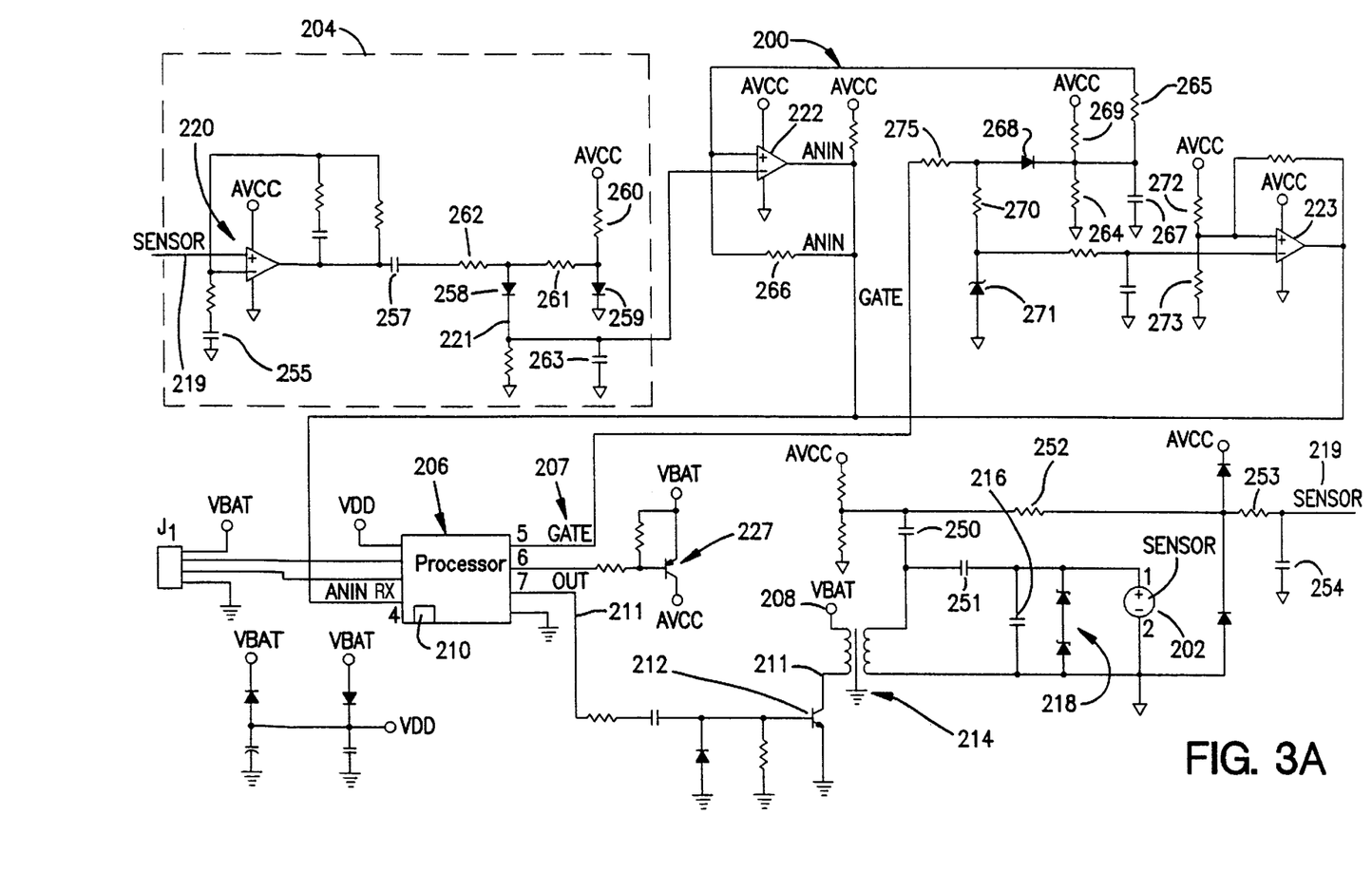
FIGS. 3A and 3B are electrical schematic circuit diagrams of a sensing and indicating system according to the present invention.
Figure 3B:
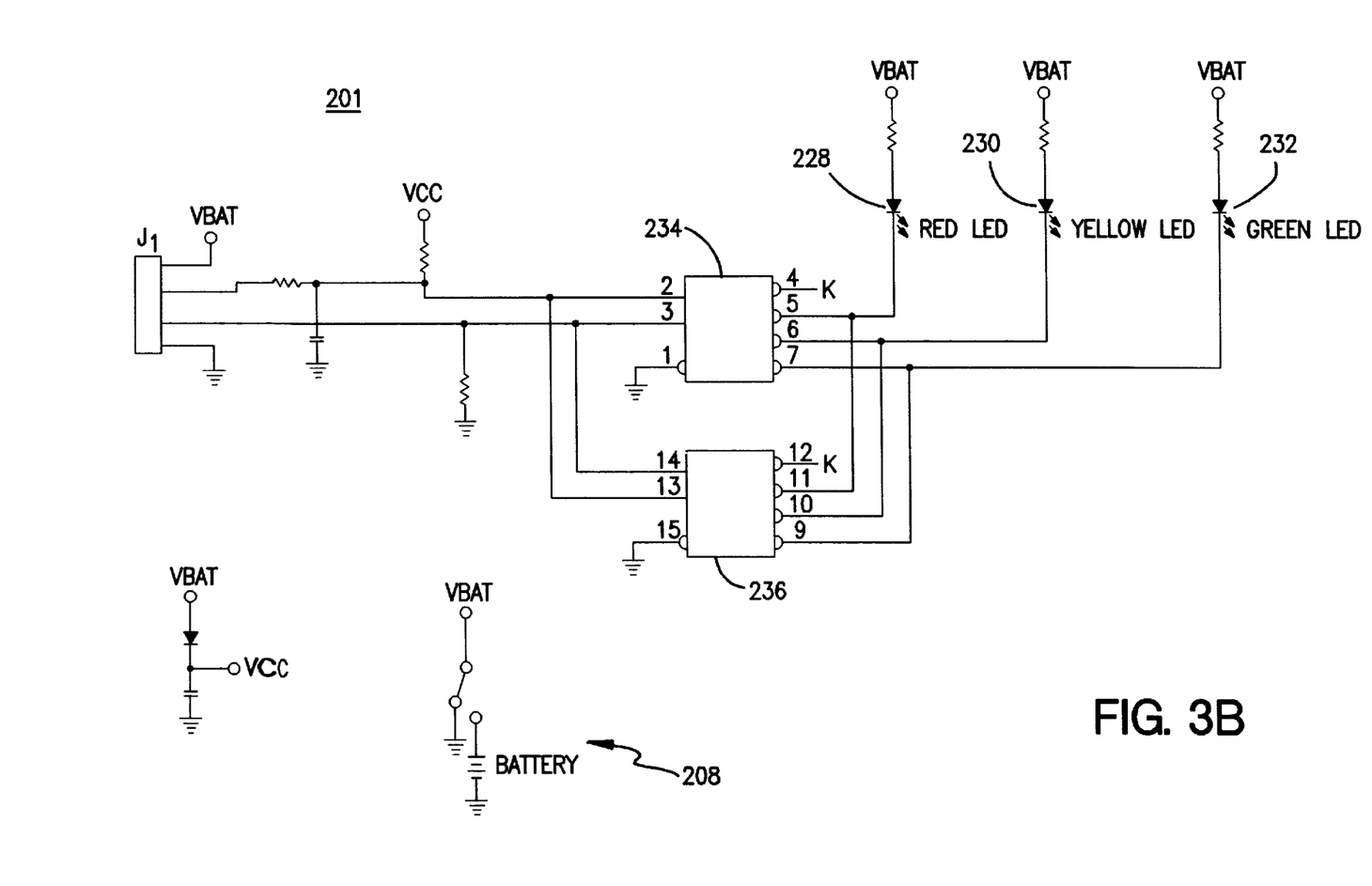

FIGS. 3A and 3B show schematic diagrams of a sensing circuit 200 and a light activation circuit 201 for detecting a vehicle entering a parking position and activating a sequence of lights to assist the driver of the vehicle in parking the vehicle. The circuit includes an ultrasound transducer(s) 202 that emits ultrasound energy pulses and senses echos of the emitted pulses. The circuit includes signal shaping circuitry 204 (shown by a broken line box) for amplifying, filtering and shaping the signals from the ultrasound transducer. Another principal component of the circuit is a processor 206, e.g., microprocessor, for generating an oscillating signal to drive the sensor, for analyzing the echo signals, and executing program instructions to operate the transducer and parking signaling lights. Processor 206 includes an internal timer/oscillator 210 that generates an ultrasound output (OUT) signal 211, e.g., 50 kHz, for brief periods of time, such as for 60 microseconds (for nearby vehicle sensing), and for 300 microseconds (for more distant vehicle detection). The output signal drives the base terminal of transistor 212 that, when on, allows current to flow from the battery terminal 208 through a transformer 214. Current is supplied to the transformer by a power source, such as battery terminal 208 that supplies a constant low-voltage, e.g., 6 volts. The battery also provides power to the other components in the circuit, such as the processor 206. Power can be supplied from other sources, such as by a 120 volt A-C from a wall socket, provided that the circuit is adapted to rectify A-C voltage. Current flows through transformer 214, when the oscillator applies an output signal to the base of the transistor 212. The software implemented oscillator from the processor provides a short train of pulses, e.g., 16 pulses, at a frequency of 50 kHz, that switches transistor 212, and allows a 50 kHz oscillating current to flow through the input coil of the transformer 214.

Transformer 214 steps-up the battery voltage to a relatively high voltage level, e.g., 400 volts peak to peak, that is sufficient to drive the ultrasound transducer 202 to emit an ultrasonic signal towards and beyond the parking space for the vehicle. The input current to the transformer oscillates at an ultrasonic frequency, e.g., 50 kHz, due to the switching of the transistor 212 being driven by the oscillator 210. The transformer in conjunction with capacitor 216, resonates the transformer secondary winding at the operating frequency and converts the drive signal to a high-voltage pulse train. The signal is clamped by a series of Zener diodes 218 in parallel with the transformer. By clamping the output of the transformer 214, the voltage pulse train that is applied to the ultrasonic transducer 202 is maintained at a uniform voltage level, e.g., 400 volts peak to peak. Alternatively, the transformer may be replaced by a lower-cost inductor for voltage step-up, provided that other conditions regarding pulse frequency and drive circuit alterations are as required. In addition, the Zener diodes prevent excessive voltage spikes from damaging the transducer. The clamped voltage pulse train drives the transducer 202 to emit ultrasonic energy, also called "pings", into the air space surrounding the parking area.

Transducer 202 may be a 7000 Series Electrostatic Transducer sold by the Polaroid OEM Components Group of Cambridge, Mass. This commercially-available transducer is operable in air at ultrasonic frequencies. A typical beam pattern for the transducer has a relatively-narrow, primary lobe extending straight out at zero (0) degrees, with a 3 dB drop-off at ten (10) degrees of arc and more than a twelve dB drop-off at twenty (20) degrees of arc. Moreover, side lobes of the transducer beam pattern are at least 12 dB below the primary lobe, on-axis. In addition, the voltage response of the transducer for both transmit and reception in the preferred embodiment is relatively uniform for frequencies between 50 kHz and 60 kHz.

The ultrasound signals, i.e., echos reflected by the vehicle, received by transducer 202, are coupled through capacitors 250 and 251, and applied to resistor 252. A low-pass filter comprised of resistor 253 and capacitor 254 is used for removal of extraneous high-frequency noise from the sensor output.

The signal 219 is first amplified by shaping circuit 204. Operational amplifier 220 is configured for a gain somewhat in excess of 100 at high frequencies. Capacitor 255 provides decoupling at low frequencies to avoid a DC offset at amplifier 220 output. AC coupling is provided by output capacitor 257, which allows differing DC potentials to appear in the circuitry which follows the amplifier. Diode 258 serves as an amplitude detector, and a degree of temperature compensated forward biasing for threshold reduction is provided by diode 259. Resistor 260 in conjunction with the power supply ($V_{CC}$) provides the excitation current for diode 259, wherein the coupling of the resulting voltage into diode 258 is provided by resistor 261.

The amplified sensor signal at 221 is low pass filtered by resistor 262 and capacitor 263. The amplified, filtered sensor signal is applied to the inverting input of an open collector comparator 222, whose comparison threshold is set by the ratio of resistors 269 and 264. Feedback hysteresis for the comparator 222 is provided by resistor 265, the parallel combination of resistors 264, 269, and resistor 266. Detection of a valid echo (sensor signal) causes the output of comparator 222 to drop from a level approximating the supply voltage $AV_{cc}$, to a value near ground. This voltage transition (ANIN) supplies the processor 206 with an input at pin 4 indicating that a sensor echo has been detected.

Comparator 222 employs a desensitizing feature to avoid false triggering from ringing within sensor 202 and drive transformer 214 following cessation of excitation. In particular, a gate signal 207 appearing at pin 5 of the processor 206 is maintained at a high level when sensor 202 is excited by a drive pulse train, and gate signal 207 falls to a low state after the sensor excitation burst ends. The high state charges capacitor 267 through diode 268 and a resistive voltage divider comprising resistors 275 and 270. When the gate signal returns to a low state, voltage decay at capacitor 267 is exponential, with the Thevinin's equivalent of resistors 269 and 264 serving as the discharge path. The resulting temporary increase in comparison voltage for comparator 222 effectively eliminates false triggering due to sensor ringing immediately after sensor excitation.

A condition of the battery connected to terminal 208 is monitored by an open collector comparator 223, the output of which forms a wired logic OR with comparator 222. During sensor 202 excitation, reference diode 271 is energized through resistors 275 and 270 from pin 5 (analog gate) of the processor 206, as described above for desensitization. Battery voltage is applied to the comparison input of comparator 223 by a voltage divider comprised of resistors 272 and 273. When the battery voltage is acceptable, the output of comparator 223 continuously remains in a high state, ie., the open collector output transistor within comparator 223 is not driven. When the battery voltage falls to an unsuitable value, output of comparator 223 falls to a low state during the sensor excitation. Because outputs of the comparators 223, 222 form a logical OR, discrimination between detection of a low battery condition and echo detection is based upon the presence or absence of sensor 202 excitation.

The echo signal (ANIN) at the output of the comparator 223 is applied to the Rx (pin 4) input of processor 206. Once processor 206 completes transmitting the ping signal, the processor may wait for a certain delay period (e.g., 2.0 milliseconds), before listening for an echo signal on the input (Rx) line.

The time duration between sensor excitation and receipt of the first valid ultrasound echo is utilized as a measure of distance to the object that reflects the echo. The round trip requires approximately 2 milliseconds per foot at sea level. The relative timings between the sensor excitation oscillating pulse train (OUT) at pin 7 of processor 206, and the gate pulse applied to pin 5 of the processor upon echo detection represent the physical distance between the source of the echos, e.g., the vehicle, and the sensor 202.

To enhance battery life, power is removed from all analog circuitry, e.g., transformer 214, sensor 202, shaping circuit 204, during periods between distance measuring cycles. This is implemented by turnoff of transistor 227 controlled by pin 6 of the processor 206. A short time prior to iteration of a measurement cycle, transistor 227 is turned on so as to apply power to the analog circuitry.

As further shown in FIG. 3B, processor 206 tracks elapsed time with an internal oscillator that allows the processor to implement an internal clock function. In addition, the processor, via one-shot logic circuits 234, 236, controls the red 228, yellow 230 and green 232 lights, e.g., light emitting diodes (LEDs), used to signal the driver-operator as the vehicle moves into its parking position.

Figure 4:
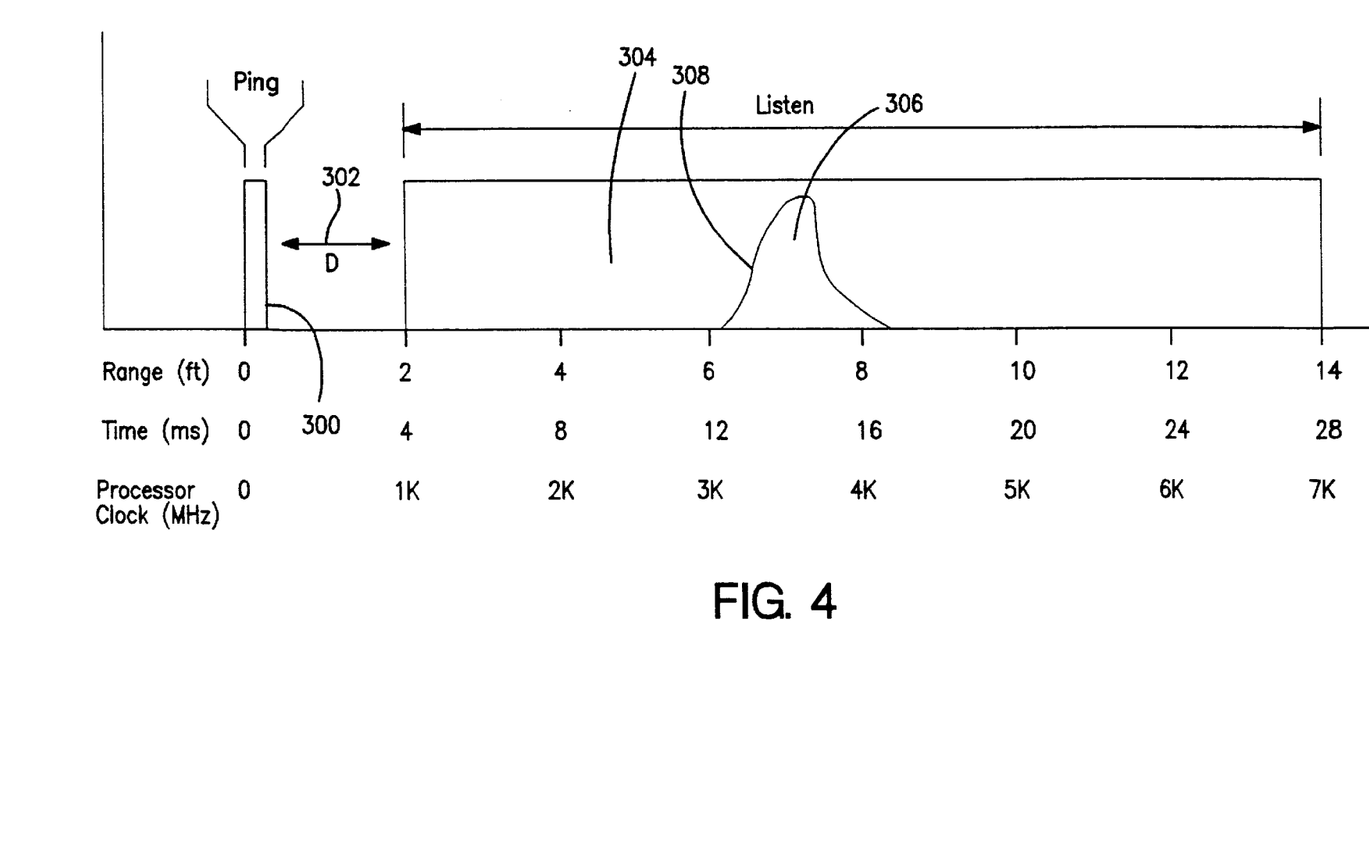
FIG. 4 is a timing diagram showing an example of the timing of an ultrasonic ping signal and the subsequent delay and listening periods.

As shown in FIG. 4, "ping" signal 300 emitted by the transducer starts a timing sequence executed by the processor 206, where the ping beginning is taken to be "time zero". The ping signal is relatively brief, as it lasts only a few pulses, e.g., 16, and less than one millisecond. For example, the ping signal may be 60 microseconds for short range (e.g., vehicle within 3 feet of sensor) detection of a vehicle, and 300 microseconds for long-range vehicle detection (e.g., vehicle between 3 to 13 feet from sensor). Time lapse is converted to distance, as elapsed time between the ping and an echo, and the distance between the transducer and the vehicle that reflected the echo, are linearly related. For example, one foot of distance between the sensor and a reflecting object would translate to about two milliseconds between the ping and echo signals.

After the ping signal is emitted by the transducer and is detected by the processor, the processor waits a period D, 302, during which it does not act on signals received from the transducer. As the ultrasound energy propagates through air, such as in an automotive garage, a portion of the energy will be reflected by relevant objects, the predominant one assumed to be a car or other vehicle. The transducer receives the echo and converts it to electrical signal which is routed to the operational amplifier, to the filtering capacitors and resistors, and to aforementioned comparator 222, before being sent to the microprocessor. After the delay period D, processor 206 awaits information from the output of comparator 222, feeding its Rx (ANIN) line, indicating an echo to have been received. The processor measures the time between the reception of the leading edge of the ping signal and that of an echo signal 306, where the timing of the echo signal is determined by the time at which the echo rises above a threshold value 308. The processor may measure time in processor instruction cycles, e.g., at a 1 MHz rate, as is indicated in FIG. 4. The processor compares the elapsed time between the transmission of the "ping" signal and the receipt of the echo to determine the distance between the transducer and the source of the echo, which is assumed to be the vehicle.

Processor 206 operates in accordance with an executable instruction sets that are described in connection with FIGS. 5A, 5B, 5C and 5D. The figures depict a set of program flow charts. The processor executes four primary executable program sets. The first program set shown in FIG. 5A determines the ideal parking distance RC1 (see FIG. 1), and the warning distance RC2 at which to illuminate a yellow light to warn the driver-operator that the vehicle is nearing the proper parked position. The second program set, FIG. 5B, is an away-condition set which periodically emits a ping to determine whether a vehicle is approaching. The third program set FIG. 5C is the parking set during which the transducer emits pings and receives echos from the vehicle that the processor uses to determine the distance of the approaching vehicle and activate a parking assistance system, e.g., a sequence of green, yellow and red lights, that indicate to the driver the distance to the parking location. The fourth program set, FIG. 5D, is the home set during which the transducer periodically emits a ping to check that the vehicle is still parked in the parking location.

Figure 5A:
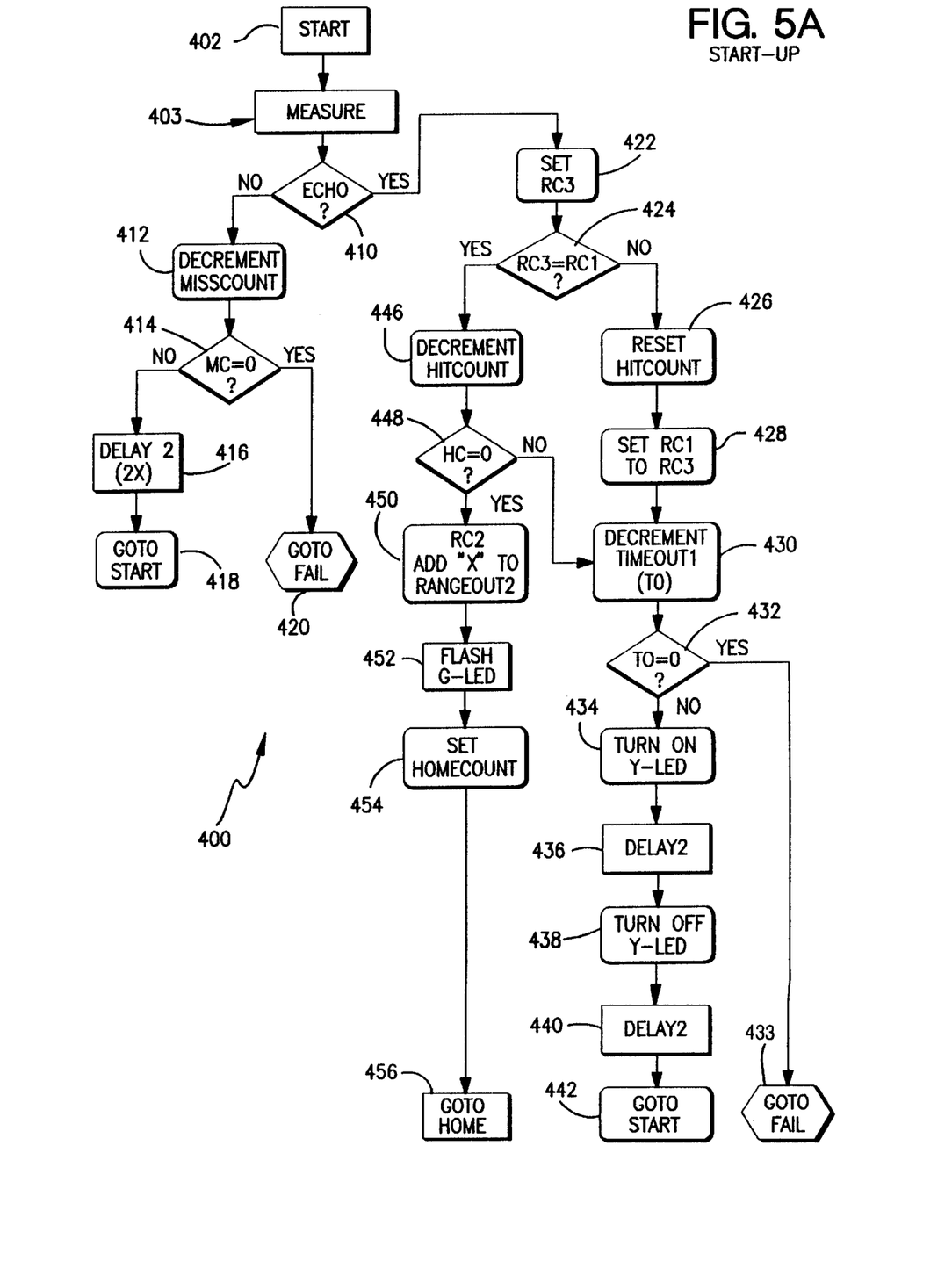
Figure 5B:
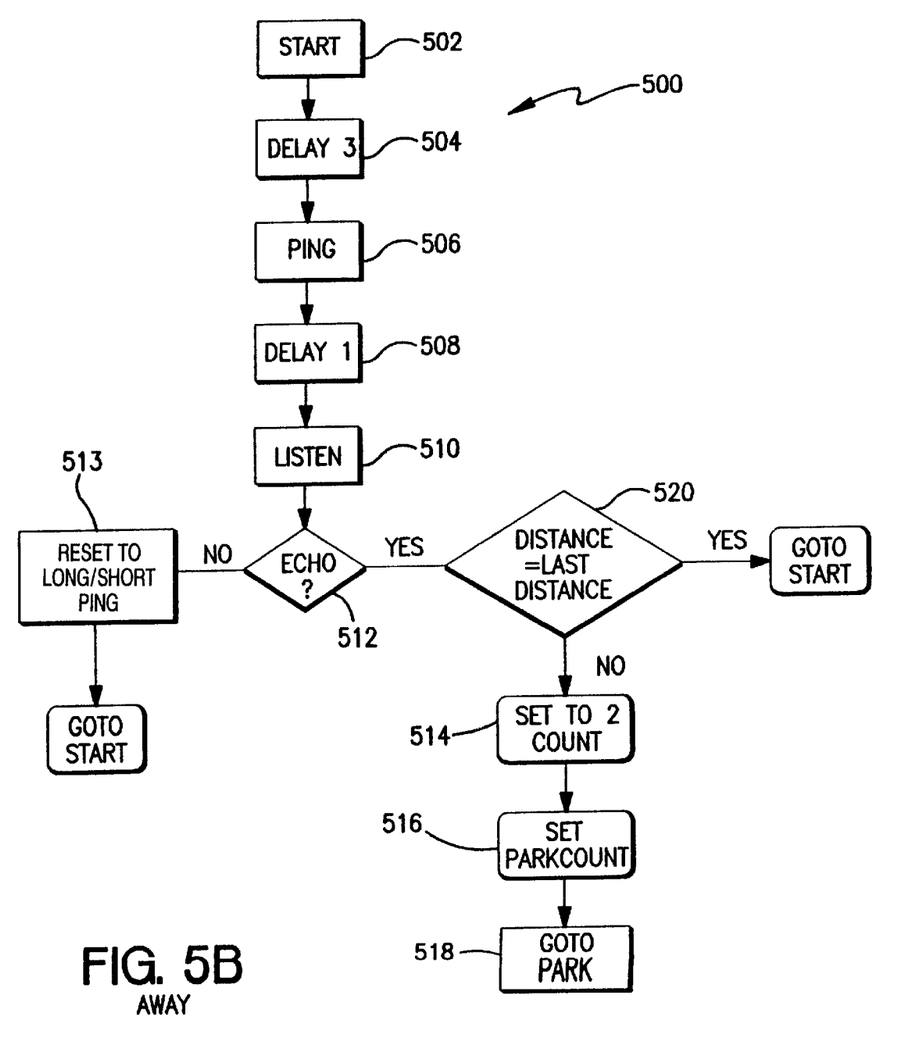
Figure 5C:
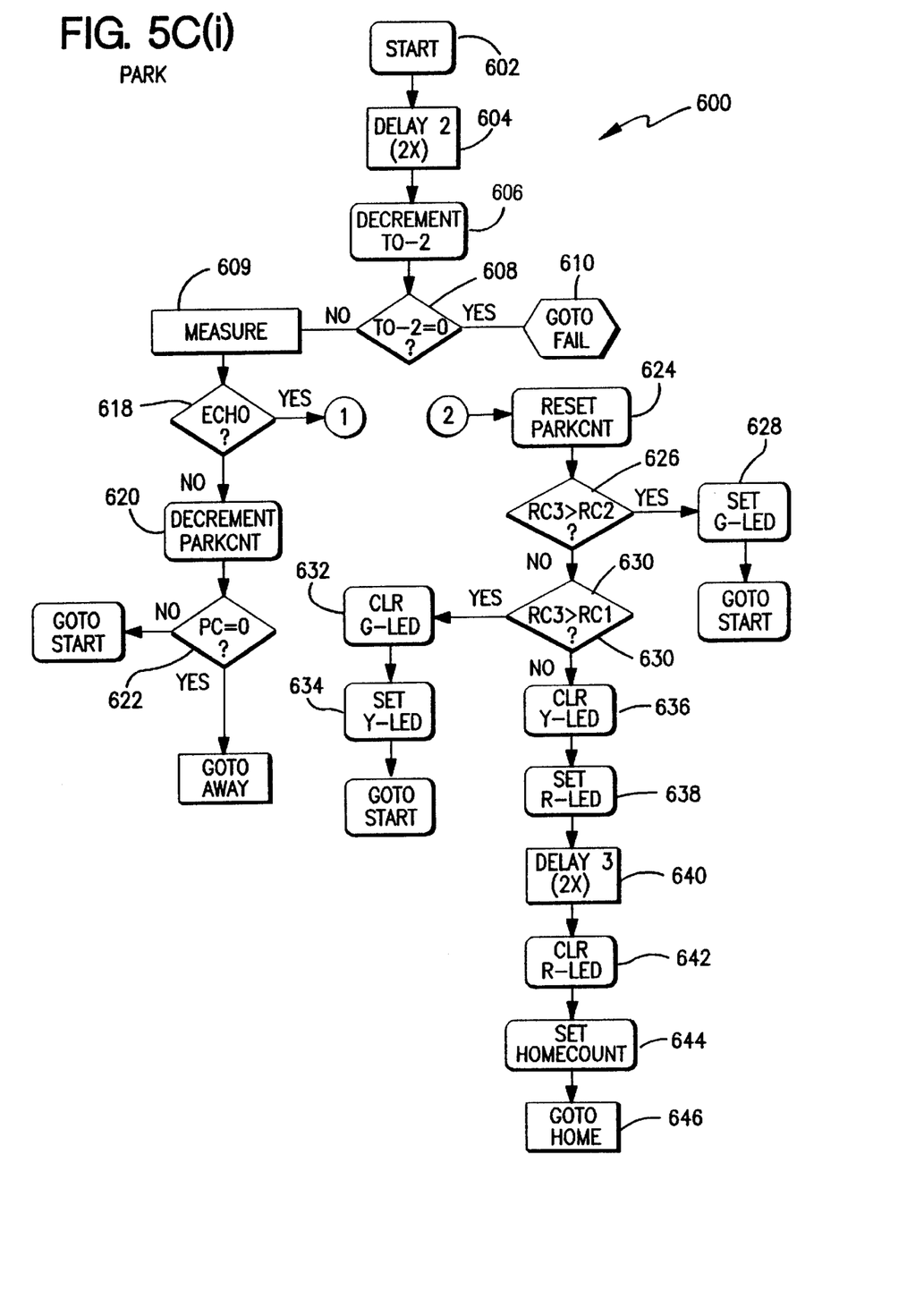
Figure 5D:
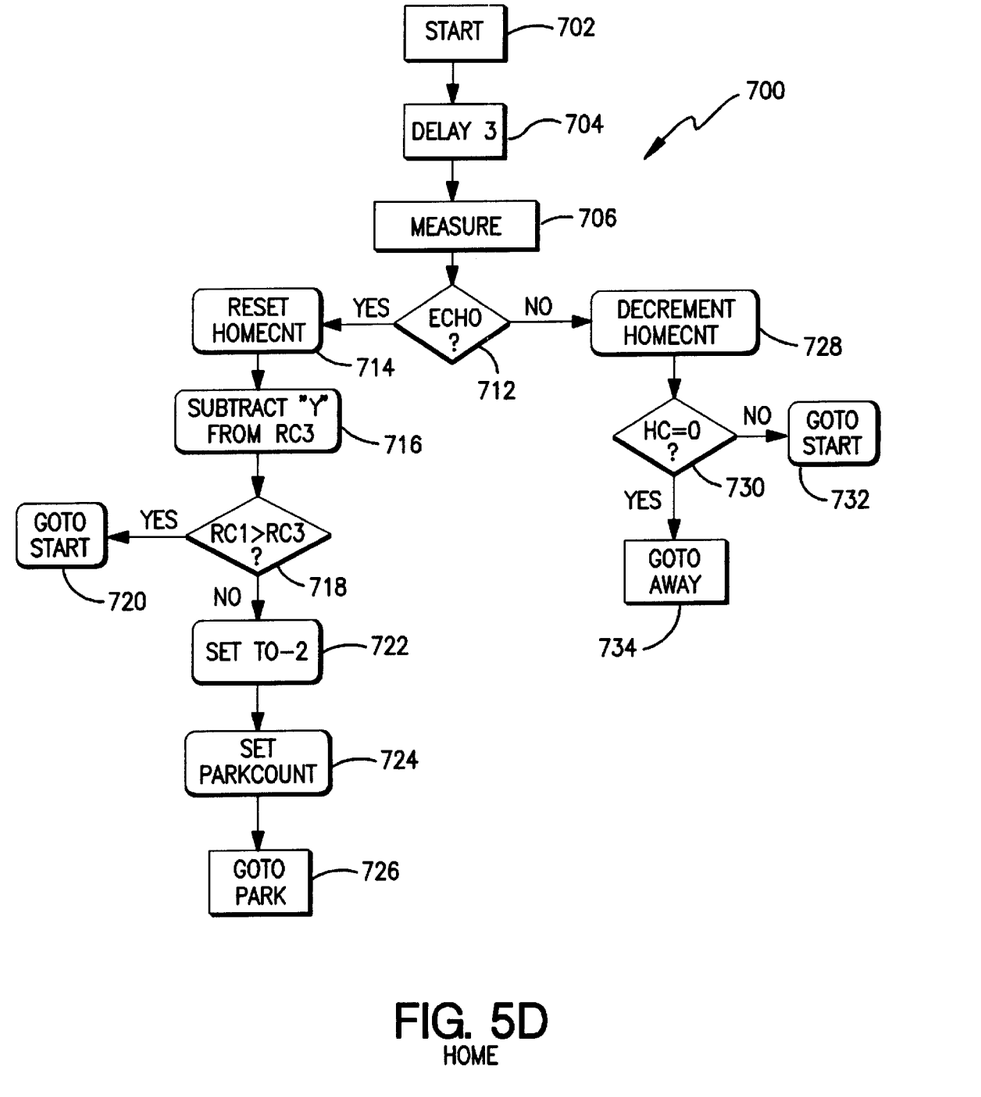

In FIG. 5A, before the start of the set-up instruction set 400, a driver-operator parks the car in its proper parking location. The driver-operator then initiates, step 402, the start-up routine by turning on the power-up button on the housing of the parking system. In the measurement step 403, the transducer first emits a short ultrasonic ping, eg., 60 microseconds in length, waits for a brief period (e.g. 2 milliseconds), and listens for an echo for a short period of about 100 milliseconds. If no echo is heard in that short period of time, there will be a delay of 100 milliseconds before the next ping occurs. If no echo is heard, then presumably no vehicle is within three feet of the sensor. The transducer will then emit a 300 microsecond ping, the processor will execute a longer delay, and then listen to determine if the object is between 3 and 16 feet. This "measure" subroutine 403 will calculate the distance between the sensor and the vehicle, and provide the measured distance. If no echo is received (step 410), absence of a vehicle or excessive distance to a vehicle is indicated. Under that condition, the processor decrements a prestored miscount value, e.g., sixteen (16) cycles, step 412. If the decremented miscount value is greater than zero, step 414, then the processor delays for a predetermined period, e.g., 100 milliseconds, step 416, and returns to restart the start-up loop, step 418. If no echo is repeatedly detected, the miscount value will decrement to zero, step 414, at which time the processor will terminate the start-up loop and transfer to a fail mode, step 420, which may flash the red light to notify the operator that a failure has occurred. If an echo signal is detected and a measurement step 403 is successfully made, the processor assumes that the signal is an echo from a vehicle, step 410. In step 422, the processor determines the measured distance determined in measurement step 403 as the current vehicle distance RC3 (see FIG. 1). Since the vehicle is assumed to be properly parked, the current vehicle distance RC3 is taken to be the ideal parking distance RC1. If the current vehicle distance RC3 does not equal the ideal parking distance RC1, step 424, then the processor resets a "hit-count" total, e.g., to four (4) cycles, and sets the ideal vehicle distance RC1 as the current vehicle distance RC3. The hit-count causes the processor to measure the ideal parking distance in step 403 several times, e.g., four, and consecutively arrive at the same ideal distance before finalizing the ideal distance. Repeating the measurement of the ideal parking distance minimizes any possibility that an error occurs in measuring the ideal location.

In step 430, the processor decrements by one its time-out counter and checks whether the time-out counter has decremented to zero, in step 432. If the time-out counter has reached zero, the processor has repeatedly executed the start-up loop an excessive number of cycles, e.g., 32, and the processor invokes a failure mode, in step 433. If the time-out counter has not decremented to zero, the processor activates a yellow light, step 434, to signal to the driver-operator that the system has successfully determined the location of the parked vehicle, step 434. The yellow light is turned off after a brief delay, e.g., 100 milliseconds, performs steps 436, 438, and the processor again waits through another brief delay, step 440, before restarting the start-up loop, step 442. When an echo is detected and the current vehicle distance RC3 equals the ideal parking distance RC1, (steps 403, 410, 424), the processor decrements the hit-count, step 446, and checks whether the hit-count has been decremented to zero, step 438. If the hit-count is not yet zero, the processor executes steps 430, 432, 434, 436, 438, 440 and 442, to check that the time-out counter is not zero and to flash the yellow light to indicate to the driver-operator that the sensor is successfully measuring the proper parking position RC1. When the hit-count is decremented to zero, step 448, the processor has a final value for the ideal parked distance RC1. Further, the processor sets a yellow light distance RC2, i.e., a warning distance, by adding a distance, e.g., two feet or one meter, to the ideal parked distance RC1, in step 450. The yellow light distance RC2 is used to determine when to light the yellow light to warn the driver-operator that the vehicle is nearing the ideal parked location. Having determined the ideal parked position RC1 and the yellow light distance RC2, the processor concludes a successful start-up procedure by flashing the green light for a brief period of time, step 452, to notify the operator-driver that the start-up procedure has been completed. The processor sets the home count, e.g., four (4) cycles, in step 454, and invokes the home count instruction set, step 456, described in connection with FIG. 4D.

FIG. 5B is a flow chart illustrating the away-condition program instructions executed by the processor while a vehicle is absent from the parking location. At the start (502) of the away loop 500 instruction set, the processor 206 waits a predetermined period of time, e.g., 1 second (step 504). This wait period is relatively long because the system is operating under an assumption that the vehicle is away from its parking space and there is nothing, e.g., no vehicle, to sense with the ultrasound transducer. By setting the wait period to a relatively long period of time, the battery power in the system can be conserved. However, the wait period is purposefully set to a maximum of only a few seconds to ensure that the vehicle does not enter the range of the transducer and move into the parking position during the wait period. Accordingly, the wait period is set short enough such that a vehicle just outside of the range of the transducer at the start of the wait period cannot reasonably move all the way to the park position during the wait period.

At the end of the wait period in step 504, the processor signals the transducer to emit a short ping, in step 506. After a brief delay in step 508 (due to the desenitizing feature described above), the processor listens, step 510, for an echo. If no echo is heard, which will be the most common result, the processor in step 512 returns to the start, step 502, of the away-condition loop and waits in step 504. As long as no echo is returned, the processor periodically emits a ping to search for a vehicle. If an echo is returned to the ping in step 512, the distance measured is compared to the last distance measurement in step 520 initialized in the PARK mode (FIG. 5C), plus or minus a few clock counts. If the measured distance is within the limits, the processor goes back to start 502. If the last measured distance is not changing, then the processor adapts to the non-moving object, e.g., a lawn mower placed in the garage, that is reflecting an echo. If the measured distance is outside the limits (which indicates a moving vehicle), then the processor sets a timeout No. 2 count (e.g., equivalent to 7.8 milliseconds), and sets the park count, e.g., to four cycles, in steps 514 and 516. In step 518, the processor invokes the park instruction set (FIG. 5C) because the processor has detected what it assumes to be a vehicle that is moving into the park position.

FIG. 5C(i) and 5C(ii) are flow charts for the park instructions executed by the processor as a vehicle is moving into its parked position. The park loop instruction set 600 is invoked only after the processor has interpreted a signal from the transducer as being an echo. In addition, the processor has interpreted this echo signal to be from the vehicle and is assuming that the vehicle is moving towards a park position. At the start, step 602, of the park loop, the processor waits, e.g., 200 milliseconds, step 604, before decrementing by one its time-out No. 2 count, which had been previously initialized to a certain time period or number of clock cycles, in step 606. The time-out No. 2 count is used to track the number of times that the processor has executed the park loop set of instructions while the vehicle has not moved. If the number of iterations through the park loop while the vehicle is not moving exceeds a predetermined count, i.e., the time-out count 2, (step 608), then the system goes to a fail mode or away instruction set (step 610).

In step 608, if the time-out No. 2 counter is greater than zero, then the processor calls the measure routine 609. If no echo is heard, the processor decrements its park count by one, step 620, and checks whether the park count has been decremented to zero, in step 622. The park count had been initialized before starting the park loop during the away-condition loop 500 to a predetermined count, such as 4. For example, if the processor proceeds through the park loop and four times does not hear an echo to a ping, the processor assumes that there is no vehicle and enters the away instruction set 500.

If an echo is detected at step 618, the processor interprets the echo as coming from the vehicle and resets the park count to an initial value, such as 4, in step 624. The processor also determines the distance measured in the "measure" routine 609 which is linearly proportional to the actual distance between the transducer and the vehicle. The echo return period is temporarily stored by the processor as an indicator RC3 of the actual current distance of the vehicle relative to transducer. The current actual distance RC3 is compared to the last actual distance (LastDist) 652 which is the last distance measured in the park mode, at the prior use of the measure step 609. If the last actual distance is equal (plus or minus a couple of counts of the processor's oscillator or clock), then the routine continues to step 624. However, if the current actual distance is not equal to the last actual distance, the counter TO-2 will be set, step 654, and last actual distance will be made equal to RC3, step 656, before the processor continues to step 624.

In step 626, the actual position value RC3 is compared to the yellow zone distance R2, which is a predetermined distance, e.g., 2 to 4 feet or one meter, from the final parking position RC1. If the actual distance RC3 of the vehicle from the transducer is greater than the yellow zone distance RC2, in step 626, then the processor sets a green light, step 628, so that the driver of the vehicle will see the green light and know to continue moving the vehicle to its park position. The processor also returns to the start of the park loop to recheck the position of the vehicle after a brief delay.

If the actual distance RC3 of the vehicle to the transducer is less than the yellow zone distance RC2, in step 626, then the processor first determines whether the vehicle is already at the parked position by emitting a short ping. If the actual distance of the vehicle RC3 is greater then the distance between the transducer and the ideal park position RC1, then in step 630 the processor clears, i.e., turns off, the previously on green light, step 632, and turns on, i.e., sets, the yellow light in step 634. Upon seeing that the green light is off and the yellow light is on, the driver should realize that the vehicle is only a short distance, e.g. 2 to 4 feet or one meter, from the final ideal parking position. The driver should slow the approach of the vehicle and prepare to stop the vehicle upon reaching the parked position.

The processor determines that the vehicle has reached the parking location when the actual vehicle distance RC3 is equal to or less than the ideal parking distance RC1, in step 630. When the processor determines that the vehicle is in the parking location, the processor turns off the yellow light, step 636, and turns on the red light in step 638. After a certain amount of time, e.g. 1 second, step 640, the processor turns off the red light, in step 642. At this point, the processor assumes that the vehicle is parked and that the park loop instruction set 600 is complete. The processor sets the home count, step 644, to a predetermined number of cycles, e.g., 4, and invokes the home loop instruction set 700.

FIG. 5D is a flow chart of the instruction set for the home loop 700. During the home loop, the processor assumes that the vehicle is parked in the proper parking position. The home loop causes the processor to continually check whether the vehicle has moved out of the parking location. If the vehicle has moved, then the home loop includes instructions that enable the processor to determine whether the vehicle has been driven away from the parking location, or if the vehicle is still parked and not moving. At the start, step 702, of the home loop, the processor waits, step 704, for a period of time, such as 2 seconds, before rechecking the location of the vehicle. In step 706 a measure routine is called to determine the distance between the transducer and vehicle. In step 712, if an echo is returned from the ping then the home count is reset, such as to four cycles, in step 714. The processor reduces the actual distance measurement RC3 by a predetermined value, e.g. 2 feet, in step 716, to check whether the vehicle is in its parking position and allow for some variation in the parking position so as to not unnecessarily restart the park loop instructions. The vehicle is deemed to be properly parked if the ideal parking distance RC1 is greater than the reduced actual vehicle distance RC3, in step 718. If the vehicle is properly parked, the processor returns to the start of the home loop, in step 720.

If an echo is returned, but the reduced actual distance RC3 is greater than the ideal parking distance, the time-out counter No. 2 is reset to, for example, 256 counts, in step 722, and the park count is reset to, for example, 4 cycles, in step 724. Having reset the timeout counter and the park counter, the processor switches to park instruction loop 726 and assumes that the vehicle is entering the parking position.

If no echo is returned, step 712, then the processor decrements by one its home counter, step 728, and checks whether the home counter has decremented to zero, step 730. If the home counter is not at zero, the processor returns to the start, step 732, of the home loop to check again whether the vehicle is parked. The processor does not assume that the vehicle has been driven away based on just one non-returned echo. The failure to receive a echo may be due to circumstances other than the vehicle having been driven from the parking location. For example, a person may have walked between the transducer and the vehicle just when the ping was emitted. Because people, especially with bulky clothing, tend to adsorb ultrasonic energy and do not efficiently reflect the energy, no echo may have been detected when a person walks in front of the transducer. Accordingly, the processor repeats the home loop several times, and does not determine that the vehicle has been driven away until no echo is return for several consecutive home loop cycles. When the home loop counter has been decremented to zero, step 730, then the processor determines that the vehicle has been driven away and the processor switches to the away loop 500 instruction set.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of positioning a vehicle within a defined space comprising the steps of:

provision an ultrasonic sensor fixed at a predetermined location;

emitting ultrasonic energy signals within the defined space and receiving echoes reflected by the vehicle, wherein the ultrasonic energy signals are emitted at a first and second periodic rate;

sensing the proximity of the vehicle relative to the sensor as the vehicle enters the defined space; and using the sensed proximity, indicating to a driver of the vehicle the proximity of the vehicle to a reference location thereby enabling the driver of the vehicle to position the vehicle within the defined space, wherein the first periodic rate has a low frequency, as compared to the second periodic rate, and the first periodic rate is utilized while no echoes are sensed, and the second periodic rate, faster than the first, is utilized when an echo is sensed as the vehicle is moving.

2. A method according to claim 1 wherein the first rate of signal emissions is a rate of no faster than one signal emission each second, and the second rate of emissions is a rate of signal emissions at least each 300 milliseconds.

3. A method according to claim 1 further comprising emitting the energy at a third rate of a signal emission of no faster than one signal emission each second, and the third rate is employed when the vehicle is stationary and has been positioned in the defined space, and while an echo is sensed.

4. A method according to claim 3 including converting the echo signal into a sequence of green, yellow and red lights to the driver of the vehicle.

5. A method according to claim 3 including converting of the echo signal into an indication audible to the driver of the vehicle.

6. A method according to claim 1 further comprising the issuance of a warning indication to the driver when the vehicle is sensed to be near the defined space.

7. A method according to claim 1 wherein the step of sensing includes transmitting an ultrasonic signal, receiving an echo of the ultrasonic signal, converting the received echo signal into an indication of the proximity of the vehicle to the defined space, and visually providing to the driver of the vehicle such indication as a function of the distance of the vehicle from the reference location.

8. A method according to claim 1 including locating the sensor relative to the defined space such that the axis of detected vehicle movement is in a direction generally perpendicular to the direction of movement of the vehicle, enabling the driver of the vehicle to position the vehicle for specific side clearance relative to the defined space.

9. A method according to claim 1 further comprising the steps of: sensing that the vehicle has not moved for a period of time, reducing the rate at which the proximity of the vehicle is sensed, and increasing the rate at which the proximity is sensed after sensing that the vehicle has again moved.

10. A method according to claim 1 including locating the sensor relative to the defined space such that the vehicle approaches the sensor as the vehicle enters the defined space, providing a second sensor fixed at a predetermined location, sensing a second proximity of the vehicle relative to the second sensor as the vehicle moves into the defined space in a direction generally perpendicular to the direction of movement of the vehicle, and using the sensed second proximity, indicating to the driver of the vehicle the second proximity of the vehicle to the reference location thereby enabling the driver of the vehicle to position the vehicle relative to the defined space in two generally perpendicular directions.

11. A method of positioning a vehicle within a defined space comprising the steps of:

providing an ultrasonic sensor fixed at a predetermined location;

emitting ultrasonic energy signals within the defined space and receiving echoes reflected by the vehicle, wherein the ultrasonic energy signals each have a predetermined time duration;

sensing the proximity of the vehicle relative to the sensor as the vehicle enters the defined space;

using the sensed proximity to determine whether the distance between the sensor and the vehicle is beyond a threshold distance, setting the time duration of the emitted ultrasonic energy signals to a first period, if the distance is beyond the threshold distance, and setting the duration to a second period, shorter than the first period, if the distance is shorter than the threshold distance, and indicating to a driver of the vehicle the proximity of the vehicle to a reference location thereby enabling the driver of the vehicle to position the vehicle within the defined space.

12. A method as recited in claim 11 wherein the first period has an order of magnitude of hundreds of microseconds, and where in the second period has an order of magnitude of tens of microseconds.

* * * * *